Feb. 4, 1969 R. L. PROPST ET AL 3,425,171
SPACE DIVIDER SYSTEM
Filed Feb. 9, 1966

INVENTORS
ROBERT L. PROPST
JAMES O. KELLEY

BY *Price & Heneveld*

ATTORNEYS

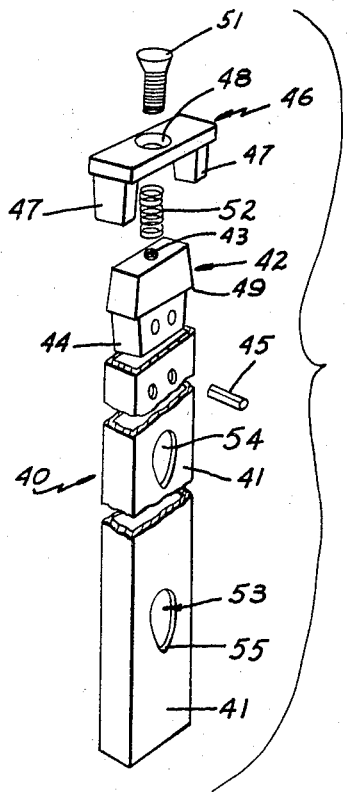
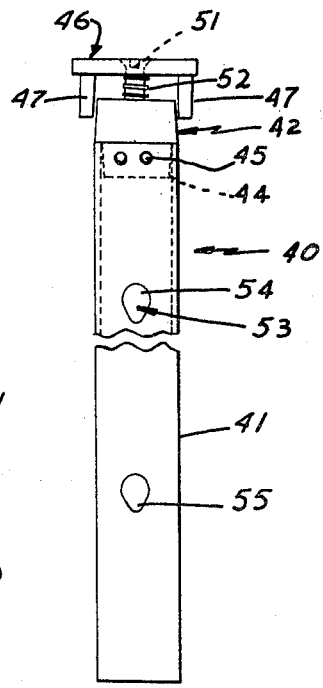
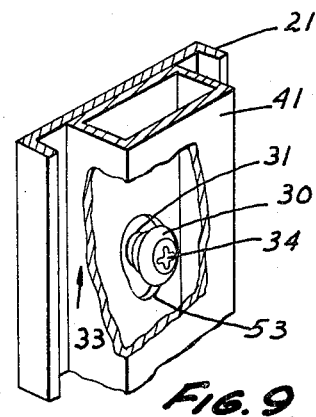
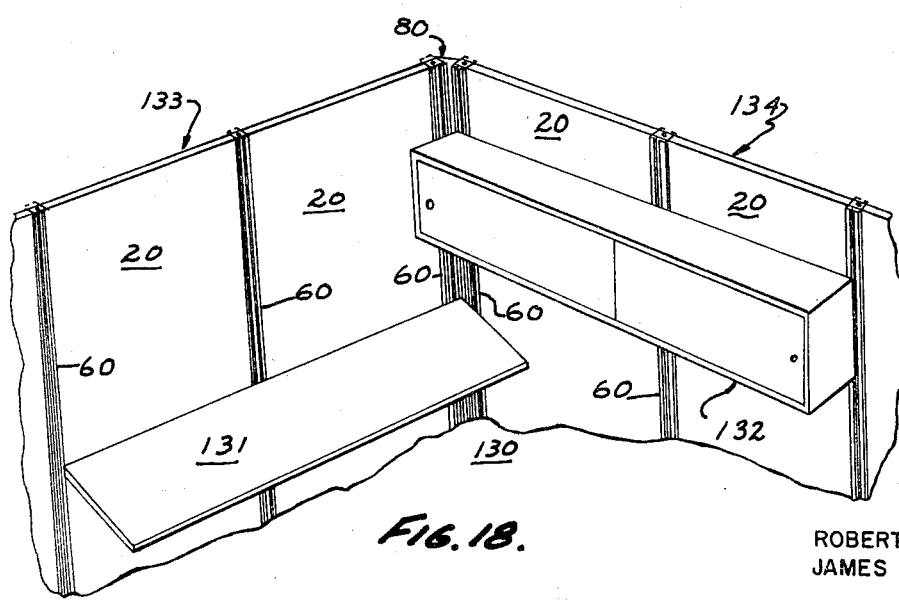

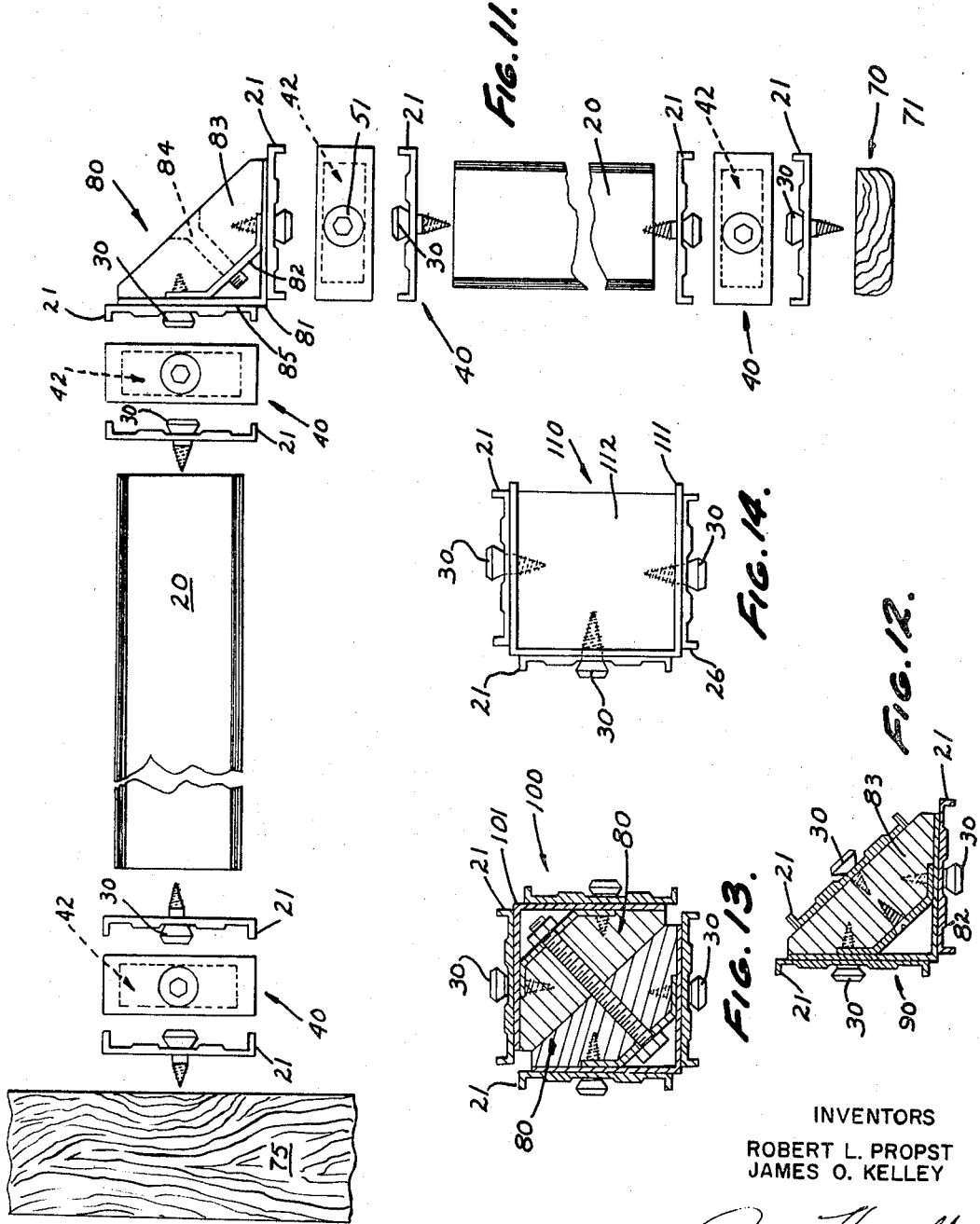

United States Patent Office 3,425,171
Patented Feb. 4, 1969

3,425,171
SPACE DIVIDER SYSTEM
Robert L. Propst, Ann Arbor, and James O. Kelley, Saline, Mich., assignors to Herman Miller, Inc., Zeeland, Mich., a corporation of Michigan
Filed Feb. 9, 1966, Ser. No. 526,146
U.S. Cl. 52—36     19 Claims
Int. Cl. A47b 5/00; E04c 2/40; E04b 2/72

ABSTRACT OF THE DISCLOSURE

A combination locking joint and accessory hanging structure for utilization in a free-standing space divider system wherein adjacent panels are affixed together by means of an elongated spline having a plurality of pear-shaped apertures therein. A plurality of wedging members extend from the facing edges of the panels, and these wedging members are received by the apertures in the spline. A bearing member is provided across the top of the panels and the spline is shifted upwardly with respect thereto by means of a threaded rod affixed to the spline and bearing against the bearing member. The joint is provided with converging flanges at either side thereof which, in conjunction with the spline, form an accessory anchoring channel adapted to receive wall-hung accessory supporting clips. It is understood that this abstract is not to be utilized to limit the scope of this disclosure.

---

This invention relates to space divider systems and more particularly to a space divider system characterized by the fact that it may be readily erected and disassembled without damage to the individual components and utilizes a minimum number of standardized parts.

For many years the means utilized to subdivide space into working subareas had been static and formalized. The systems did not permit modification nor were they reversible. About a decade ago, however, entirely new concepts on space usage began to gain public acceptance. For the first time attempts were made to adapt the working area to the particular demands of the job being performed. Out of this concept there arose a requirement that the particular work area subdivision be capable of rearrangement so that the work areas could be readily and rapidly changed from the requirements of one task to the requirements of an entirely different task. This trend today is being accelerated by the rapid introduction of entirely new equipment and methods of work, making the work space demands of each task more and more specialized.

This trend has had its greatest impact in the field of education but now is spreading into research and commercial and industrial work environments. Much effort and time has been spent in trying to develop means for subdividing work space which is capable of meeting these entirely new requirements. This effort has not produced an entirely satisfactory answer. The attempted solutions have been too cumbersome, expensive and lacking in versatility to satisfy the new approach to work environment subdivision.

This invention provides an advanced solution to this situation. It provides a space divider having capability of arrangement in many forms and shapes. At the same time it can be disassembled and re-erected in an entirely new pattern of space division with complete revisability of all components. It has adaptability to a wide variety of arrangements making it highly versatile.

The invention permits rapid, low cost rearrangement because all its components are freely reusable. It utilizes a small number of standardized components each of which is connected to adjacent components by a spline device capable of aligning and securing the panels in a single movement. The necessity for manipulation of numerous separate conventional fasteners is eliminated. Further, the joint so formed is rigid and positive and cannot wrack or loosen. The spline device also automatically compensates for adverse tolerance accumulation eliminating one of the severe problems which has plagued previous attempts to provide a versatile answer to demands for adaptability of rearrangement. Since the spline device is positive, self aligning and operates by means of a single movement, the entire space divider system of this invention can be erected by unskilled personnel with minimal instruction.

The invention also adds an entirely new concept to space divider systems. It provides means for mounting a wide variety of work components directly on the wall formed by the space divider. Most of these components are of the type conventionally treated as furniture and supported from the floor, such as for example, desks, work tables, storage cabinets and shelving. This invention makes these components freely interchangeable, adjustable and reusable. They are so mounted to the space divider walls that their attachment and removal involves few if any conventional fasteners and leaves no mark or visible evidence of their removal. No modification of the panel structure is required for any of work components. Every panel joint automatically becomes a work component mounting means extending the full height of the panels. Thus, not only may the panels of the system be rearranged, but the work components can also be rearranged swiftly at any time to adopt a particular work space to an entirely different usage requirement. The combination of these two concepts entirely eliminates the static features which have plagued previous space divider designs.

Having thus described this invention, its specific objectives are set out in the following paragraphs.

It is an object of this invention to provide a space divider system utilizing a minimum number of different types of components to allow a relatively maximum flexibility within the system.

It is an object of this invention to provide a space divider system which may be installed, knocked down and reconstructed, according to a rearranged plan by relatively unskilled labor.

It is an object of this invention to provide a space divider system in which all of the parts are movable by and may be assembled by one man only.

It is an object of this invention to provide a space divider system possessing the inherent capability to stand freely without wall, floor or ceiling connections.

It is an object of this invention to provide a panel connector which, with minor modifications, may be utilized to form four-wall intersections, straight panel connections, or any of a myriad of other types of intersections.

It is an object of this invention to provide a space divider system in which the divider panel components may be manufactured locally and relatively inexpensively because they require no mill work, detail or close tolerances.

It is an object of this invention to provide a connection device for divider panels wherein the tolerances are automatically controlled by factory fabrication of the connector devices.

It is an object of this invention to provide a connecting assembly incorporating a stationary reference device toward which the connecting spline may be pulled by means such as a bolt, and thus eliminate the necessity for lifting one panel with respect to another in order to drive them together or pounding the spline into the panels, both of which operations require more than one man for execution and tend to be more permanent than flexible.

It is an object of this invention to provide a connecting device for divider panels which, when engaged, is operative to rigidly affix the adjacent panels together and, yet, which is operative when released to allow the disassembly of the panels with relative ease.

It is an object of this invention to provide a panel connector assembly which may be affixed to panels of varying thickness without adversely affecting the functional aspects of the connector.

It is still another object of this invention to provide a divider system wherein the divider panel connectors, when installed, provide work area support channels, the tolerances of which are automatically controlled by factory fabrication of the panel connector device.

It is an object of this invention to provide a system of the type described in which work and storage areas may be supported by the divider panels and may run in either direction from a perpendicular wall intersection.

It is yet another object of this invention to provide a flexible hinge for utilization in systems of the type described wherein any desired angle between divider panels may be easily achieved during the installation procedure.

These as well as other objects of this invention will be easily understood by reference to the following specification and accompanying drawings in which:

FIG. 6 is a broken, exploded perspective view of the connector spline;

FIG. 7 is a broken, side-elevational view of the connector spline;

FIG. 9 is a fragmentary, broken perspective view of one divider panel with the connector spline in position for engagement with the keepers;

FIG. 11 is an exploded plan view of two walls arranged at right angles to each other;

FIG. 12 is a plan view of a typical Y-connection post;

FIG. 13 is a sectional plan view of a typical four-corner intersection post;

FIG. 14 is a plan view of a typical T-intersection post;

FIG. 18 is a fragmentary, perspective view of one corner of a typical enclosure.

Figure 1:
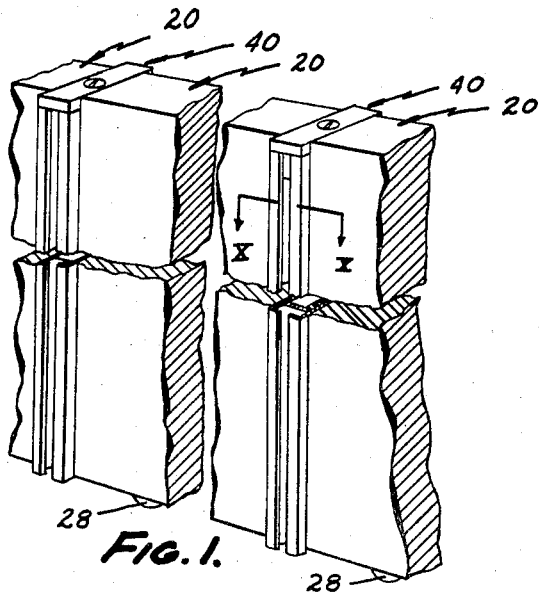
FIG. 1 is a fragmentary, broken perspective view of three aligned wall panels which have been connected utilizing the panel connectors of this invention.
Figure 2:
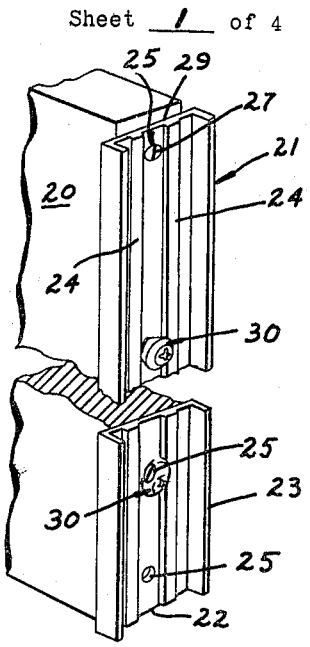
FIG. 2 is a fragmentary, broken, perspective view of one of the working edges of a typical divider panel.
Figure 3:
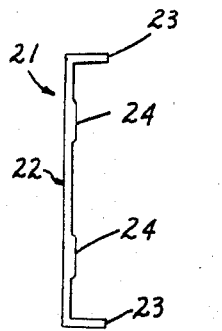
FIG. 3 is a plan view of the panel edge extrusion.

This invention comprehends the use of panels of conventional construction having a pair of parallel side edges to which the connection, forming this invention, may be mounted. The connection includes a pair of shallow U-shaped channels one of which is mounted to an edge of one panel and the other to the edge of a panel to be joined thereto. The legs of the U-shaped channels are arranged to extend toward each other. In mounting the channels the fastener heads are surrounded by wedge shaped keeper buttons. The actual joining of the panels is accomplished by a vertically shiftable tubular spline opposite faces of which seat firmly against the channels between the flanges when the spline is shifted vertically to bring the buttons into wedging engagement with suitable openings provided in the opposed faces of the spline. To provide a stationary reference means for shifting the spline a cap piece is rested on the upper ends of the channels. This cap is connected to the spline by a conventional fastener, manipulation of which controls the shifting movement of the spline.

Referring now to the figures a preferred embodiment of this invention will be described in detail. FIGS. 1 through 9 illustrate the details of the preferred embodiment of the panel to panel connector assembly. A plurality of divider panels indicated generally by the reference numeral 20 may be formed from wood, plastic or metal or combinations of any or all these. The panels may contain doors or other opening closures as is well known in the art. Because of the nature of the panel connector assembly to be described, it is not essential that the widths of the panels be standard. Therefore, many commercially available types of door and window frames may be incorporated into the system with an attendant reduction in specialized manufacture.

Affixed to the vertical edges of each of the divider panels 20 is a shallow generally U-shaped channnular extrusion 21 having a base section 22 and, two lips 23 extending parallel from opposite edges thereof. Preferably, for reasons which will become apparent hereinafter, the channnular extrusions also include a pair on longitudinal ribs 24, each of which is positioned between the middle of base section 22 and one of the extending lips 23. As viewed best in FIGS. 2 and 4, an aligning aperture 25 is provided in each end of channnular extrusion 21 and a series of uniformly spaced keeper receiving apertures 26 are drilled in alignment therewith along the longitudinal center line of the extrusion. Channnular extrusion 21 is preferably fabricated from aluminum and may be formed by any well known extrusion process. Alternatively, it might be formed by different fabrication procedures and from different materials. Preferably, the channnular extrusions 21 are pre-cut to length and have the aligning and keeper receiving apertures formed therein during the fabrication process thus providing an accurate template or guide for point of erection assembly.

Attachment of channnular extrusions 21 to the panels 20 can readily be accomplished at the situs of installation. To do this, it is necessary only to scribe a center line along the edge of the divider panel and position the channnular extrusion 21 thereover in such manner that its bottom is flush with the bottom of the panel and the centers of the aligning apertures 25 are directly over the scribed center line. A pair of aligning screws 27 may then be inserted into the divider panel to rigidly position the channnular extrusions 21 with respect thereto. As shown best in FIG. 2, the extrusion 21 terminates a short distance from the top of the panel so as to provide a shoulder 29 recessed below the panel top. Additionally, at this or some other convenient time, a series of adjustable feet 28 may be inserted into the panel bottoms in order to compensate for irregularities in the surface of the floor upon which the divider system is to be installed. As is well known, these screws may be adjusted during installation to insure that the upper surfaces of the divider panels will remain approximately level and the adjacent panels approximately parallel. Thus, the connector splines will not be subjected to unnecessary wedging forces in bringing the panel edges into parallel relationship.

Figure 4:
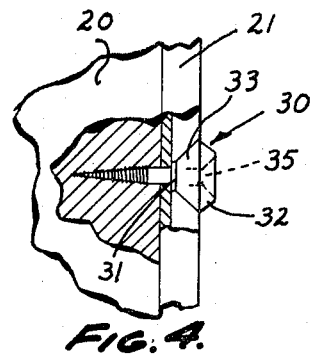
FIG. 4 is a partially sectional elevational view of a divider panel and the keeper or wedging button particularly illustrating the manner in which the keeper is affixed to the panel.
Figure 5:
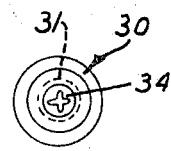
FIG. 5 is a front elevational view of the keeper or wedging button.

The keepers or wedging buttons 30, shown best in FIGS. 4 and 5, have a circular shank section 31, an outwardly divergent frusto-conical clamping surface 33 and an outwardly convergent frusto-conical guide surface 32. Once the channular extrusion has been affixed to the edge of the divider panel by means of positioning screws 27, the channular extrusion may be utilized as a template to drill the screw holes for attachment of the keeper buttons 30. The keeper is then mounted by installation of the screws 35. The screws are tightened until the end of the shank portion 31 bears firmly against the channular extrusion. It is important that the length of the shank portion 31 be equal to or less than the combination of the wall thickness of the tubular spline hereinafter described and the height of the ribs 24. The installation of the screws 35 not only secures the buttons 30 but also anchors the channular extrusion to the panel. The channels are thus installed on all vertical edges of the panels to be utilized in the installation.

The spline connector assembly 40, shown best in FIGS. 6 and 7, consists of a tubular upright 41 which is conveniently a commercially available rectangular aluminum extrusion. The utilization of this type of material eliminates the necessity of providing special extrusion dies and thus keeps the overall cost of the system at a minimum.

A lift cap 42 having a threaded aperture 43 therein is inserted into the top end of tubular upright 41. The lift cap has a converging end section 44 to facilitate its insertion into tubular upright 41. The lift cap is provided with a shoulder 49 which abuts against the edges of the tubular upright. The lift cap is affixed to the upright by any well known means such as the spring pins 45.

A bearing plate 46 having an inset guide and stabilization leg 47 positioned at each end thereof and a countersunk aperture 48 in its upper surface is affixed to the cap 42 by means of a screw 51. Preferably, a compression spring 52 surrounds the screw 51 between bearing plate 46 and lift cap 42 as a means of maintaining the maximum spacing between the two members and thus assists the installation procedure in a manner which will become apparent hereinafter.

Positioned along the bearing faces of tubular uprights 41 are a plurality of inverted pear-shaped apertures or slots 53. The spacing of slots 53 corresponds to that of the keeper elements 30 on the divider panels. Each of the pear-shaped slots 53 has an enlarged button or keeper receiving section 54 and a converging gripping section 55. The slots are indentically spaced on each bearing face of tubular upright 41 and conveniently may be fabricated therein by punching completely through both bearing faces in a one-step operation, producing lateral alignments. The inwardly extending ribs 24 in the base section of channular extrusion 21 maintain the spline face at the button receiving apertures away from the base of extrusion 21 and thus it is not necessary to remove any burr that may be left on the downward side of the tubular upright during the punching process.

Figure 8:
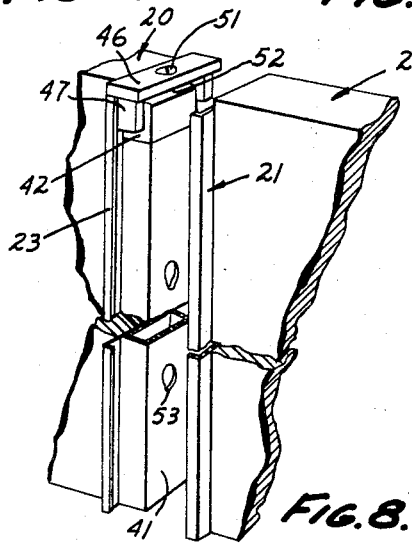
FIG. 8 is a fragmentary, broken, exploded, perspective view showing one panel fitted to the connector spline and the adjacent panel in position to be moved into engaging relationship therewith.

Referring now particularly to FIGS. 1, 7 and 8, when it is desired to rigidly affix two of the divider panels together it is necessary only to loosen cap screw 51 on any of the connector splines and place that particular spline against the edge of one of the divider panels to be joined such that the keeper receiving sections 54 of slots 53 mate with and receive keepers 30. During this operation the spring 52 functions to maintain bearing plate 46 in an elevated position so that it may easily pass over and rest upon the shoulder 29 of channular extrusion 21 without having to be separately guided by hand. Additionally, the depending guide and stabilization legs 47 on bearing plate 46 prevent the bearing plate from rotating with respect to the lift cap 42 and thus assure that the proper initial fit may be obtained when working from the bottom of the divider panel. This is extremely important insofar as minimizing the installation complexity is concerned, because without the provision of these aligning and lifting components the height of the divider panels would often render installation of the system by one person extremely difficult if not impossible.

It will be seen from FIG. 8 that the relative dimensions of the bearing plate and the legs 47 depending therefrom are such that the exterior surfaces of legs 47 fit between the inwardly extending lips 23 of each channular extrusion 21 and that the thickness of the bearing plate 46 is such that it lies flush with the top of the panel when resting upon shoulder 29 of channular extrusion 21. Once the spline connector assembly 40 has been positioned with respect to one of the divider panels, a second divider panel is moved into mating relationship therewith and its keepers 30 are received by slots 53 in an identical manner. The tubular upright 41 is of sufficient width to allow the two facing keepers of the adjacent panels to pass thereinto without interfering with each other.

Once both of the divider panels 20 are in this position, screw 51 is rotated in such a manner as to draw the tubular upright 41 towards bearing plate 46. This forces the clamping surfaces 33 of the keepers 30 into the progressively restricting gripping section 55 of the slots 53 and thus pulls the panels into tightly abutting relationship with tubular upright 41. As the tubular upright is raised, the narrowing slot 53 must ride closer and closer to the base of the channular extrusion because of the frusto-conical shape of the keeper. Thus, the more the tubular upright 41 is raised, the tighter becomes the fit between the connector and its adjacent divider panels, the connection so formed is extremely rigid and, yet, may be easily removed by merely loosening cap screw 51 and allowing the tubular upright 4 to drop away from bearing plate 46. The connection is also strong because it forms multiple joints between the top and bottom of the panels.

The longitudinal ribs 24 on the spline-butting surface of channular extrusion 21 serve to bear the majority of the compression load between tubular upright 41 and channular extrusion 21. Localizing the support area in this manner serves to insure that the pressure at any given point along channular extrusion 21 will be approximately equal. Thus, for example, if a burr appears on the exterior edge of one of the slots 53 because of the punching operation, it will ride within the void below the ribs 24 and will not interfere with a proper seating of the connector spline. Additionally, the ribs 24 eliminate any chance that channular extrusion 21 will be warped or forced out of shape because of unequal bearing stresses thereon.

Figure 10:
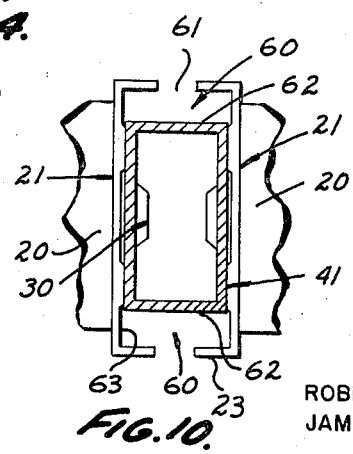
FIG. 10 is a section taken along the plane X—X of FIG. 1.

As shown best in FIG. 10, the tubular upright 41 is dimensioned such that it does not completely fill the space existing between inwardly extending lips 23 of channular extrusion 21. Also, the width of tubular upright 41 is such that the inwardly extending lips 23 do not completely close upon one another as the panels are drawn into abutting relationship with the spline but, rather, leave a vertical access slot 61 in each of the opposite surfaces of the divider panel wall at each spline location. The result is an elongated cavity 60 through the slot 61 between the adjacent channel legs. The cavity 60 is significantly wider than the slot. This permits the mounting of accessory equipment in such a manner that it is largely or entirely supported by the space divider panels. The accessory equipment may, as desired, comprise a storage chest, a desk, a coat rack or any one of a number of other service items which are commercially available. One type of apparatus for hanging the various items of accessory equipment to this structure is illustrated in U.S. Patent No. 3,039,727 to R. G. Engel, Jr., dated June 19, 1962. This patent is cited merely by way of reference and there are other satisfactory devices available.

The completed dimensions of the anchoring channel 60 are determined solely by the factory controlled dimensions of the tubular upright 41 and the channular extrusions 21. Even if channular extrusions 21 were not centered on the edges of panels 20, the dimensions of the anchoring channel 60 would not be distorted since the channular extrusion 21 serves as a template for anchoring the keepers 30 to the panel edges. Thus, no particular skill is required by the person erecting panels in order to obtain a workable and satisfactory installation.

Referring now to FIG. 11, a typical perpendicular installation and the details of the cornering post will be described. The right angle corner post 80 consists of a section of metallic angle 81 of approximately the same height as the divider panels 20. Affixed to the outer or convex surfaces 85 of the angle 81 are two channular extrusions 21 which are identical to those utilized throughout the entire system. Depending upon the particular material utilized for support angle 81, it may be necessary to reinforce it at selected locations along its longitudinal length by any well known means such as reinforcing straps 82. The remaining concave section of the angle 81 if desirable, may be filled by a block of wood 83 having a finished surface on its rear side. Many types of well known means are available for assembling the corner post components 80 as well as for attaching the channular extrusions 21 and the keepers 30 thereto. If no wooden filler block 83 is utilized, a bolt and nut arrangement is satisfactory. The bolts, or course, would be shouldered in such a manner as to fit into the counter-sunk apertures in the various components. Alternatively, screws driven into wooden filler block 83 might also be utilized. It will be apparent that the same type of fastening means which supports the keepers 30 may also support the various reinforcing straps 82.

Once the corner post 80 is in position, the panels 20 are affixed to each of the channular extrusions 21 in a manner identical to that descirbed with regard to the in-line panel to panel connection. The utilization of the universal anchoring channels 21 on the cornering assemblies permits the use of identical components throughout the system. Additionally, it will be noted that accessory equipment anchoring channels 60 are formed on each side of the corner post immediately adjacent thereto, thus allowing activity areas such as desks and storage units to be hung abutting the corner but extending in either direction therefrom.

It will be noted that a partition may be initiated at any flat surface such as wall 75 by merely affixing one of the extrusions 21 thereto in the same manner as it is ordinarily affixed to a divider panel edge. The partition may then be extended from this point in the conventional manner. Note that this construction provides an accessory anchoring channel adjacent wall 75. The partition so formed may be of any desired height although the desirability of being able to interchange components dictates that, in so far as possible, panel height should be kept constant within a given installation.

Once the desired number of divider panels 20 have been aligned in each direction, the particular wall may be terminated by means of wall termination assembly 70 which consist of a dress cap 71 affixed to one of the universal channular extrusions 21. Dress cap 71 may conveniently be fabricated from wood and the channular extrusion 21 and the keepers 30 may be affixed thereto in the same manner that they are affixed to one of the divider panel edges. Of course, it would be possible to merely terminate the wall at a panel edge but this would severly limit the number of available accessory anchoring channels and thus restrict usage of an appreciable amount of the wall surface.

In the event that it should be decided to form a Y-intersection, a cornering post therefor may be fabricated by simply affixing another channular extrusion 21 to the cornering device as shown in FIG. 12. The walls extend from post 90 at angles of 90 degrees, 135 degrees and 135 degrees. The extra channular extrusion 21 may be affixed to a pre-existing cornering post 80 by the same type of fastening devices which are utilized to affix it to the panel edges. Again note that the Y-shaped cornering post 90 will, when affixed to its respective divider panels, provide an accessory anchoring channel 60 on both sides of each wall adjacent the cornering post and thus allow accessory equipment to extend therefrom in all directions.

In the event that it should be desired to have a four-wall intersection, a post as shown in FIG. 13 may be formed therefor by positioning two of the ninety-degree cornering posts 80 in back to back relationship with the diagonal surfaces of their wooden filler blocks abutting. So positioned, the two cornering devices may be affixed together by any well known means such as a series of bolts 101 spaced longitudinally therealong. Once again complete freedom in mounting accessory equipment parallel to any wall is retained.

Should it be desired to form a T-intersection, a cornering post 110 may be fabricated therefor by merely affixing three channular extrusions 21 to the exterior surfaces of a metallic channel 111 as shown in FIG. 14. Preferably, a wooden strip 112 is placed within the channel and the channular extrusions 21 affixed thereto through the metallic channel 111 by means identical to those utilized in affixing them to the panel edges. It will be apparent, of course, that the wooden filler block 112 could be omitted and bolts utilized to affix the channular extrusions to the metallic channel. Alternatively the channular extrusions could be affixed directly to the wooden strip 112 and the channel 111 omitted.

Note that in all of the different types of cornering devices, the channular extrusions 21 are terminated a short distance below the upper surface of the supporting post so as to provide a ledge upon which bearing plate 46 may rest and so as to allow the upper surfaces of the completed assembly to be relatively planar.

Figure 15:
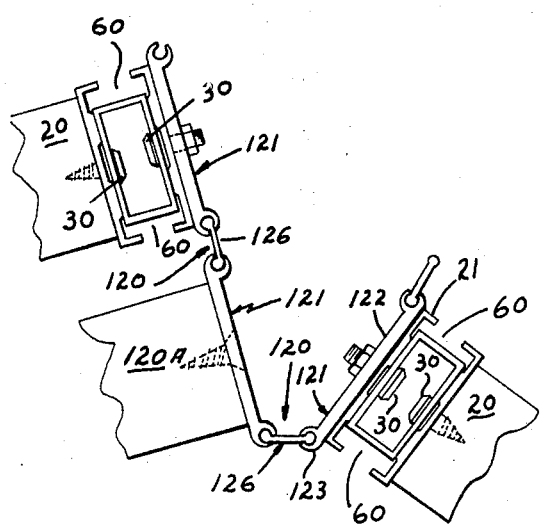
FIG. 15 is a plan view of a plurality of divider panels connected by flexible hinges which constitute a modified form of this invention.
Figure 16:
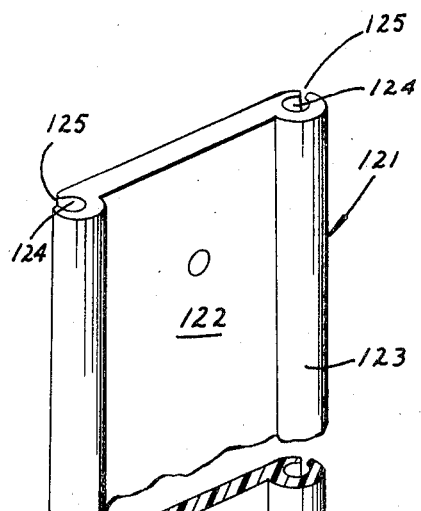
FIG. 16 is a broken, perspective view of the flexible hinge keeper.
Figure 17:
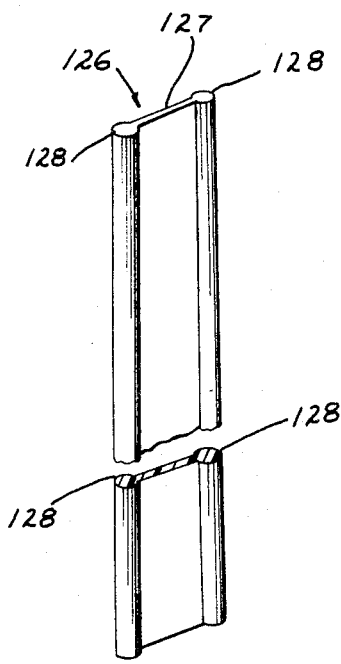
FIG. 17 is a broken, perspective view of the flexible hinge.

In some installations, it is occasionally desirable to form a corner angle of greater or lesser dimensions that can adequately be provided for by prefabricated angles, channels, and filler blocks. Referring now to FIGS. 15, 16 and 17 a preferred mode for accomplishing this result without necessitating the custom manufacture of cornering posts will be illustrated. The hinge assembly 120 is formed by a longitudinally slotted keeper strip 121 which is affixed directly to the back of one of the channular extrusions 21 by any convenient means such as bolts, the forward ends of which may be utilized to affix the channular extrusion 21 and the keepers 30 together. The keeper strip 121 has a planar midsection 122 which terminates along opposite longitudinal edges thereof in expanded, relatively cylindrical sections 123. Each of the sections 123 has a hinge receiving channel 124 extending longitudinally throughout its entire length. A necked-down, or restricted section of chanel 124 provides a continuous seat-like opening 125 along the entire length of the keeper strip.

The flexible hinge adapted for utilization with the hinge assembly 120 conveniently may be fabricated as by extrusion from neoprene or polyethylene elastromer and has a planar midsection 127 and a pair of enlarged edge sections or beads 128. As shown in FIG. 15, the beads 128 of the flexible hinge 126 are slidably inserted into adjacent receiving channels 124 in the keeper strips 121. The necked-down section 125 is sufficiently large to allow passage of the planar midsection 127 of the flexible hinge, but insufficiently large to allow the expanded or beaded edge sections 128 to pull free from longitudinal channels 124. The panels may then be rotated with respect to one another until the desired angular relationship is achieved by bending the midsection of the hinge. Alternatively, a plurality of panels may be so joined or interconnected to form virtually any type of intersection. Preferably, the hinge keepers 121 are affixed to channular extrusions 21 so that an accessory anchoring channel 60 will be formed adjacent each corner when the divider panels are attached thereto. But it will be appreciated by those skilled in the art that the hinge keeper strip 121 could be affixed directly to the edge of the panel as indicated by the panel 20A in FIG. 15. As the panels are rotated with respect to one another the planar midsection 127 of the flexible hinge 126 bends but still maintains the panels in closely adjacent relationship at their corner extremities. Also it conceals the interior of the joint and provides an effective closure of the gap between the panels.

Referring now to FIG. 18, there is shown one corner of a typical enclosure 130 containing a drafting table 131 supported by partition 133 and a storage cabinet 132 supported by partition 134. The availability of anchoring channels 60 adjacent each side of cornering post 80 allows the storage cabinet 132 to extend over but perpendicular to the table 131 and thus lends added versatility to the divider assembly.

The width of the divider panels is kept constant throughout a given system and, preferably, throughout all of the systems such that work and storage areas may be manufactured to standard modular dimensions and thus be fully interchangeable when it is desired to expand or modify one particular system.

Thus it will be seen that this invention has provided a space divider system which will regidly connect adjacent divider panels in a plurality of configurations and, yet, which may be easily detached therefrom such that a new arrangement may be made. These functions are preformed with a minimum of expense because of the utilization of a minimum number of standard extrusions which are universal throughout the space divider system. The relative simplicity of affixing the channular extrusions 21 to the panel edges, of fabricating different types of support posts, and of assembling and knocking down entire installations allow unskilled labor to be utilized when executing these functions. They also allow the heavier parts of the system—i.e., the divider panels themselves—to be fabricated by local contractors from materials which may be obtained locally at a good price, thus saving on both shipping, warehousing and the cost of materials. The system is integrated in the sense that the accessory anchoring channels provided at constant intervals along the constructed partition sections allow such items as desks, storage areas, etc., to be attached thereto at any desired location.

While a number of preferrd embodiments of this invention have been illustrated in detail, it will be apparent to those skilled in the art that many modifications may be made therein without departing from the spirit and scope of this invention. Such modifications are to be considered as falling within the scope of the following claims unless these claims, by their terms, expressly state otherwise.

I claim:

1. In a space divider system having at least one pair of adjacent panels, a connecting device for said panels comprising:
   a plurality of keepers affixed to the adjacent sides of said panels, said keepers having a first wedging section, the narrowest portion of which is positioned adjacent the panel to which that particular keeper is attached;
   a pair of rigidly spaced spline faces each of said faces having an aperture therein with an enlarged receiving section adapted to receive the widest portion of said first wedging section and a restricted section adapted to grip said keepers;
   a stationary bearing plate supported from said panels; and
   mechanical advantage adjustable means connecting said bearing plate to said spline faces, said adjustable means being adapted to forcibly alter the spatial relationship between said bearing plate and said spline faces to force said keepers into said restricted sections.

2. The combination as set forth in claim 1 wherein said first wedging sections are frusto-conical in shape.

3. The combination as set forth in claim 2 in which said keepers further comprise a second frusto-conical wedging section, said second wedging section being affixed to said first wedging section such that the widest portions thereof abut whereby said second wedging section guides said keepers into said receiving section when one of said spline faces is brought into mating relation with one of said panel sides.

4. The combination as set forth in claim 1 in which said rigidly spaced spline faces comprise a generally rectangular, hollow spline and in which said apertures are positioned at equal and corresponding intervals along opposite faces thereof.

5. The combination as set forth in claim 1 which further comprises:
   a channnular member having a base section and a pair of side sections extending therefrom, affixed to the side of each of said panels, the side sections of any given channnular member projecting away from and running parallel to the panel edge to which said given channnular member is attached, said first wedging section being positioned partially within said channnular member whereby said spline faces are forced into abutting relationship with said base sections as said wedging sections are moved into said restricted sections.

6. A connector for joining the adjacent edges of a pair of panels, comprising:
   a rigid spline member having a pair of spaced faces positioned between said edges;
   a plurality of wedge shaped keeper elements;
   engaging means for receiving said keeper elements therethrough, said keeper elements being on one of said panels and said spline and said keeper element engaging means being on the other thereof, said keeper elements having inclined wedging surfaces urging said panels and said spline together when said spline is shifted lengthwise of said edges toward one end of said panels;
   a stationary bearing plate supported from said panels, said plate spanning the space between and being supported from each of said panels; and
   mechanical advantage adjustable means connecting said bearing plate to said spline faces, said adjustable means being adapted to forcibly shift said spline lengthwise of said edges to urge said panels and said spline together.

7. The combination as set forth in claim 6 which further comprises biasing means urging said bearing plate away from said spline.

8. A connector for connecting the adjacent edges of a pair of panels and forming therewith an accessories anchoring channel, said connector comprising:
   a spline of predetermined thickness positioned between the adjacent edges of said panels whereby said adjacent edges are spaced apart a predetermined distance;
   a lip extending from each of said panels, said lips converging into the space between said panels but terminating prior to touching to form a slot, the inner surface of said lips being spaced from the facing surface of said spline whereby an activities anchoring channel bounded on opposite sides by one surface of said spline and said inner surface of said lips is formed and accessible through said slot; and
   wedging element means for securing the adjacent edges of said panels to said spline.

9. The combination as set forth in claim 8 in which said spline, said lips, and said accessories anchoring channel extend continuously substantially the entire height of said panels.

10. A corner construction for space divider panels comprising:
    an angle member having at least two faces set at an angular relationship to each other;

a shallow U-shaped channel having a base and legs secured to each of said faces at the base thereof with the legs of the U projecting outwardly therefrom;

a plurality of panels each having a shallow U-shaped member having a base and legs mounted to one vertical edge thereof with the legs of the U projecting outwardly therefrom;

a plurality of spline elements, one between each of said panels and each of said U-shaped members on said angle member, said spline elements having spaced faces abutting the bases of adjacent U-shaped members and holding them apart so that the legs thereof define a vertical slot therebetween, the interior surfaces of the legs being spaced from said spline elements to define recesses therebetween; and a plurality of two-part interengageable wedging elements, each of said wedging elements having one part on said spline and the other on one of said panels, said spline being vertically movable to affect wedging engagement between said parts for drawing and rigidly locking said panels together.

11. In a space divider system means for affixing a partition surface to an adjacent stationary surface, said means comprising: a rigid spline member having a pair of spaced faces positioned between said surfaces; a plurality of wedge shaped keeper elements; and engaging means for receiving said keeper elements therethrough, said keeper elements being on one of said adjacent surfaces and said spline, and said engaging means being on the other thereof, said keeper elements having inclined wedging surfaces urging said adjacent surfaces and said spline together when said spline is shifted lengthwise of said adjacent surfaces; a stationary bearing plate spanning the space between said surfaces and resting upon each of the structures of which said surfaces form a part; and mechanical advantage adjustable means connecting said bearing plate to said spline, said adjustable means being adapted to forcibly shift said spline lengthwise of said adjacent surfaces.

12. In a space divider system having at least one pair of adjacent panels, a connecting device for said panels comprising:

a plurality of keepers affixed to the adjacent sides of said panels, said keepers having a first wedging section, the narrowest portion of which is positioned adjacent the panel to which that particular keeper is attached;

a pair of rigidly spaced spline faces, each of said faces having an aperture therein with an enlarged receiving section adapted to receive the widest portion of said first wedging section and a restricted section adapted to grip said keepers;

means for moving said spline faces after said keepers have been inserted into said apertures whereby said first wedging sections are moved into said restricted sections and thus said spline faces are forced into abutting relation with their adjacent panels; and a channular member having a base section and a pair of side sections extending therefrom affixed to the sides of each of said panels, the side sections of each channular member projecting away from and running parallel to the panel edge to which the channular member is attached, the lower edge of said channular members being flush with the bottoms of said panels and the upper ends of said channular members terminating below the tops of said panels, said first wedging section being positioned partially within said channular member whereby said spline faces are forced into abutting relationship with said base sections as said wedging sections are moved into said restricted sections.

13. The combination as set forth in claim 12 in which said means for moving comprise:

a stationary bearing plate supported by the upper ends of said channular members; and adjustable means connecting said bearing plate to said spline faces whereby, upon manipulation of said adjustable means, said spline faces will be pulled toward said bearing plate.

14. In a space divider system, a flexible hinge for connecting adjacent divider panels, said hinge comprising:

a keeper strip adapted to be secured to adjacent edges of said panels, at least one of said strips being affixed to the rear face of a metallic base, said base having a pair of parallel lips extending forwardly from each longitudinal side thereof to form a forwardly facing channel, each of said strips having a slot therein running longitudinally therealong having an expanded section and a necked-down section, said necked-down section providing a continuous opening along the length of said slot;

a flexible hinge member of approximately the same length as said slots, said member having an elongated midsection and an enlarged marginal bead along each edge thereof, said beads adapted to be inserted into the expanded sections of said slots with the midsection extending from the necked-down section thereof into the space between said panels, said necked-down section being of insufficient dimensions to allow said bead of said hinge member to pass therethrough; and a plurality of wedge-shaped keeper elements affixed to said base, said elements being positioned at least partially within said forwardly facing channel.

15. Apparatus for firmly interconnecting adjacent panels in a space divider system, said apparatus comprising:

a wedging member protruding from the facing edges of each of said adjacent panels and projecting into the space therebetween;

wedging member mating means positioned between said panels, said mating means adapted, when shifted vertically, to engage simultaneously both said wedging members and upon continued movement to draw said panels together;

bearing member means positioned in generally fixed vertical relationship with respect to said panels and projecting into the space therebetween;

force transmission means affixed to said wedging member mating means and extending at least to said bearing member means, said force transmission means including mechanical advantage means for forcibly varying, by means of selective manipulation, the spacing between said bearing member means and said wedging member mating means to cause said wedging member mating means to shift vertically either into or out of wedging engagement with said wedging members.

16. The appartus as set forth in claim 15 which further comprises spaced flanges projecting towards each other lengthwise of the panel connection, said flanges terminating short of abutment to form an elongated vertical slot for the reception of brackets to mount accessory items at said panel connection.

17. The apparatus as set forth in claim 15 wherein the lower edges of said panels abut the surface upon which said system is positioned.

18. The apparatus as set forth in claim 15 wherein said bearing member means spans the space between adjacent panels and depends for vertical support on each said panel, said bearing member means having an aperture therein, said mechanical advantage means including a threaded rod passing through said aperture, said rod having an enlarged head portion adapted to bear against said bearing member means.

19. In a panel joint including a vertically shiftable locking member for rigidly connecting adjacent components together, the improvement comprising converging lips extending from and affixed to the edges of each said component, said lips partially bounding the space between said components produced by the presence of said locking member, said lips terminating short of abutment to form an elongated vertical slot along the height of said components at said joint, the rear sides of said lips being spaced from interior components of said joint to provide therebehind recesses, said recesses being adapted to receive accessory hanging clips through said slot, said clips adapted to support accessories in wall-hung fashion at said joint.

References Cited

UNITED STATES PATENTS

| 2,970,677 | 2/1961 | Springs et al. | 52—239 X |
| 3,139,958 | 7/1964 | De Witt | 52—585 X |
| 3,229,334 | 1/1966 | Thome | 52—585 X |
| 3,303,626 | 2/1967 | Brigham | 52—586 |

FOREIGN PATENTS

| 205,507 | 11/1956 | Australia. |
| 684,903 | 4/1964 | Canada. |
| 1,168,712 | 9/1958 | France. |
| 1,187,160 | 3/1959 | France. |
| 854,253 | 11/1960 | Great Britain. |

FRANK L. ABOTT, *Primary Examiner.*

CHARLES G. MUELLER, *Assistant Examiner.*

U.S. Cl. X.R.

52—71, 239, 585; 287—20.92